(12) United States Patent
Kurashige et al.

(10) Patent No.: US 10,400,997 B2
(45) Date of Patent: Sep. 3, 2019

(54) ILLUMINATION DEVICE

(71) Applicant: Dai Nippon Printing Co., Ltd., Tokyo (JP)

(72) Inventors: Makio Kurashige, Tokyo (JP); Shumpei Nishio, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/777,291

(22) PCT Filed: Nov. 18, 2016

(86) PCT No.: PCT/JP2016/084268
§ 371 (c)(1),
(2) Date: May 18, 2018

(87) PCT Pub. No.: WO2017/086439
PCT Pub. Date: May 26, 2017

(65) Prior Publication Data
US 2018/0356074 A1   Dec. 13, 2018

(30) Foreign Application Priority Data

Nov. 20, 2015 (JP) .................................. 2015-227509

(51) Int. Cl.
*F21V 17/02* (2006.01)
*F21V 13/06* (2006.01)
(Continued)

(52) U.S. Cl.
CPC ................ *F21V 13/06* (2013.01); *F21S 2/00* (2013.01); *F21V 5/008* (2013.01); *F21V 5/04* (2013.01);
(Continued)

(58) Field of Classification Search
None
See application file for complete search history.

(56) References Cited

FOREIGN PATENT DOCUMENTS

| JP | H02-69405 U1 | 5/1990 |
|---|---|---|
| JP | 2012-146621 A | 8/2012 |

(Continued)

OTHER PUBLICATIONS

Japanese Office Action dated Jan. 9, 2018 for corresponding Japanese Application No. 2017-551947.
(Continued)

*Primary Examiner* — Vip Patel
(74) *Attorney, Agent, or Firm* — Michael Best & Friedrich LLP (57) ABSTRACT

An illumination device including a light source; a light scanner for changing a light path of light-source light; a light diffusion device having element diffusion devices; and a light-path adjustment device disposed on a light path of the light-source light, the light-path adjustment device having element adjustment devices corresponding to respective element diffusion devices, adjusting a light path of the light-source light. An incident position of the light-source light on the light-path adjustment device varies depending on a light path determined by the light scanner. An incident angle of the light-source light on each element diffusion device varies depending on an incident position on the element adjustment device corresponding to the element diffusion device. An emergent angle from each element diffusion device varies depending on the incident angle on the element diffusion device. Each element diffusion device illuminates an element illumination area corresponding to the element diffusion device.

14 Claims, 4 Drawing Sheets

(51) Int. Cl.
| | |
|---|---|
| F21S 2/00 | (2016.01) |
| F21V 5/04 | (2006.01) |
| F21V 9/00 | (2018.01) |
| F21V 14/04 | (2006.01) |
| G02B 5/02 | (2006.01) |
| G02B 5/32 | (2006.01) |
| G02B 26/12 | (2006.01) |
| F21V 5/00 | (2018.01) |
| F21V 23/00 | (2015.01) |
| G03H 1/02 | (2006.01) |

(52) U.S. Cl.
CPC ............... *F21V 9/00* (2013.01); *F21V 14/04* (2013.01); *G02B 5/02* (2013.01); *G02B 5/32* (2013.01); *G02B 26/12* (2013.01); *F21V 23/003* (2013.01); *G03H 1/0248* (2013.01)

(56) References Cited

FOREIGN PATENT DOCUMENTS

| | | |
|---|---|---|
| JP | 2012-227102 A | 11/2012 |
| JP | 2014-207167 A | 10/2014 |

OTHER PUBLICATIONS

International Search Report dated Feb. 14, 2017 for PCT Application PCT/JP2016/084268.
Translation of Written Opinion of International Searching Authority dated Feb. 14, 2017 for PCT Application PCT/JP2016/084268.

ILLUMINATION DEVICE

CROSS-REFERENCE TO RELATED APPLICATIONS

This application is entering into national phase of PCT Application No. PCT/JP2016/084268, filed on Nov. 18, 2016, which claims the priority from Japanese Patent Application No. 2015-227509, filed on Nov. 20, 2015 in the Japanese Patent Office, the entire contents of which are hereby incorporated by reference into this application.

TECHNICAL FIELD

The present invention relates to an illumination device.

BACKGROUND ART

As disclosed in JP2012-146621A, for example, an illumination device using a coherent light source is widely used. A laser light source that oscillates a laser light (laser beam) is typically used as the coherent light source.

JP2012-146621A discloses a vehicle lighting tool. The vehicle lighting tool includes a light source, which can be formed by a laser oscillation device, and four hologram devices. The respective hologram devices are moved by a rotary driving apparatus to be located on positions where they can receive a laser light from the light source. The respective hologram devices diffract the laser light to achieve illumination in a desired light distribution pattern. By suitably selecting a hologram device which is irradiated with a laser light, illumination in a predetermined light distribution pattern can be achieved. In order to achieve illumination in a great number of light distribution patterns by using this vehicle lighting tool, it is necessary to increase the number of hologram devices that can be selectively irradiated with a laser light. In this case, the structure and control of the device become significantly complicated. Further, while it is necessary to ensure light paths of incident light and emergent light for each hologram device, the number of hologram devices that are rotatably supported about one axis has an upper limit. Namely, the illumination device (lighting tool) disclosed in JP2012-146621A is difficult to perform illumination in a great number of light distribution patterns.

DISCLOSURE OF THE INVENTION

The present invention has been made in consideration of the above point. The object of the present invention is to provide an illumination device capable of performing illumination in various light distribution patterns by a simple structure.

An illumination device according to one embodiment of the disclosure comprises:
 a light source;
 a light scanner capable of changing a light path of light-source light emitted from the light source;
 a light diffusion device having element diffusion devices that diffuse the light-source light; and
 a light-path adjustment device disposed on a light path of the light-source light from the light scanner up to the light diffusion device, the light-path adjustment device having element adjustment devices that are provided correspondingly to the respective element diffusion devices, and adjust a light path of the light-source light toward the corresponding element diffusion devices;

wherein:
 an incident position of the light-source light on the light-path adjustment device varies depending on a light path determined by the light scanner;
 an incident angle of the light-source light on each element diffusion device varies depending on an incident position on the element adjustment device corresponding to the element diffusion device;
 an emergent angle from each element diffusion device varies depending on the incident angle; and
 each element diffusion device illuminates an element illumination area corresponding to the element diffusion device.

In the illumination device according to the one embodiment of the disclosure, light emitted from each element adjustment device may travel along one of light paths of convergent light fluxes to enter an element diffusion device corresponding to the element adjustment device.

In the illumination device according to the one embodiment of the disclosure, element illumination areas corresponding to the respective element diffusion devices may not be overlapped with one another.

In the illumination device according to the one embodiment of the disclosure,
 the light scanner may have a rotatable reflection device;
 the reflection device may include reflection surfaces at positions surrounding its rotational axis line; and
 an angle defined by one reflection surface included in the reflection surfaces with respect to the rotational axis line may differ from an angle defined by at least another reflection surface included in the reflection surfaces with respect to the rotational axis line.

The illumination device according to the one embodiment of the disclosure may further comprise a light condensing device disposed on a light path of the light-source light from the light scanner up to the light-path adjustment device.

In the illumination device according to the one embodiment of the disclosure, the light scanner may be located on a position based on a front-side focal point of the light condensing device.

In the illumination device according to the one embodiment of the disclosure, the light-path adjustment device may have a lens array including unit lenses constituting the element adjustment devices.

In the illumination device according to the one embodiment of the disclosure, each element diffusion device may be located on a position based on a rear-side focal point of a unit lens constituting a corresponding element adjustment device.

In the illumination device according to the one embodiment of the disclosure, each element diffusion device may be located on a position based on a rear-side focal point of a unit lens constituting a corresponding element adjustment device.

In the illumination device according to the one embodiment of the disclosure, each element diffusion device may be located on a position apart from a unit lens, corresponding to said element diffusion device, by a focal point distance of said unit lens constituting an element adjustment device.

In the illumination device according to the one embodiment of the disclosure, each element adjustment device may allow the light-source light to enter a specific area of a corresponding element diffusion device, irrespective of an incident position of the light-source light on the element adjustment device.

In the illumination device according to the one embodiment of the disclosure, the light diffusion device may be a hologram storage medium, and the element diffusion devices may be element holograms including interference fringe patterns different from one another.

In the illumination device according to the one embodiment of the disclosure, the light diffusion device may be a lens array group having lens arrays constituting the element diffusion devices.

The illumination device according to the one embodiment of the disclosure may further comprises a control unit that controls emission of light from the light source, depending on an incident position of the light-source light on the light adjustment device.

According to the one embodiment of the disclosure, the illumination device of a simple structure can perform illumination in various light distribution patterns.

MODE FOR CARRYING OUT THE INVENTION

Embodiments of the present invention will be described herebelow with reference to the drawings. In the drawings attached to the specification, a scale size, an aspect ratio and so on are changed and exaggerated from the actual ones, for the convenience of easiness in illustration and understanding.

Further, terms specifying shapes, geometric conditions and their degrees, e.g., "parallel", "perpendicular/orthogonal", "same", etc., are not limited to their strict definitions, but are to be construed to include a range capable of exerting a similar function.

Figure 1:
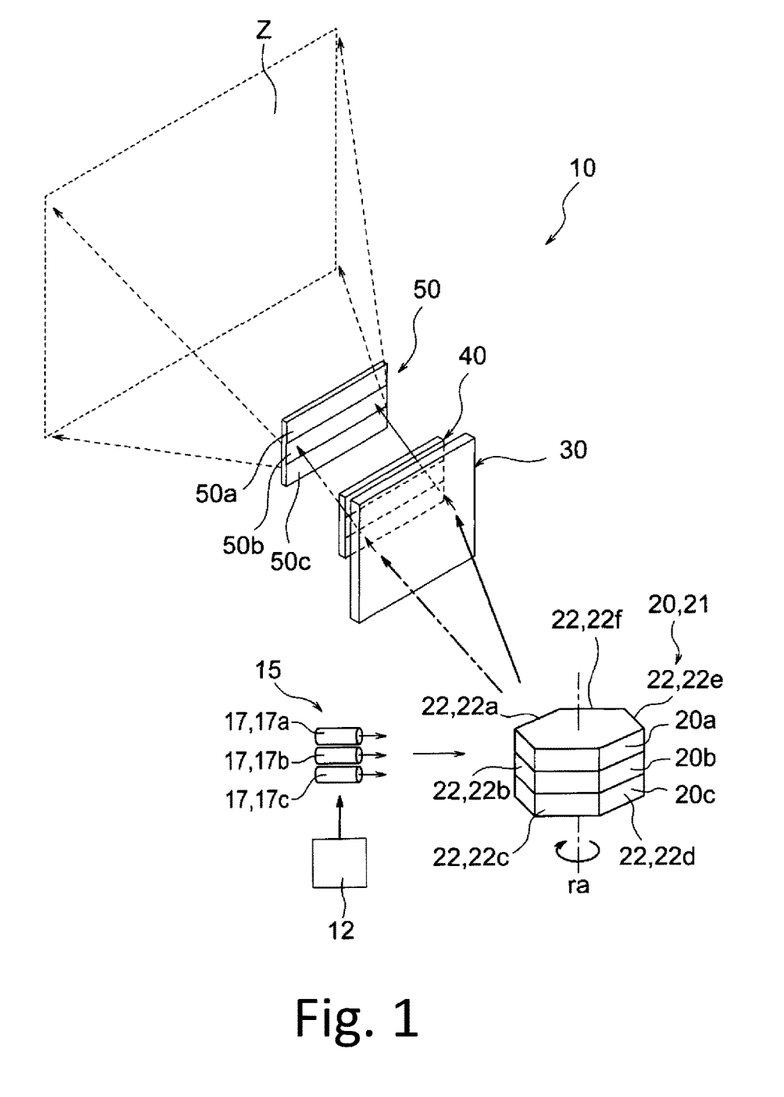
FIG. 1 is a perspective view schematically showing an overall structure of an illumination device, for explaining one embodiment of the present invention.

FIG. 1 is a perspective view showing an overall structure of an illumination device 10. The illumination device 10 illuminates an illumination area Z by using a coherent light such as a laser light (laser beam). The illumination device 10 includes, as a light source, a laser light source 15 that oscillates a laser light. The laser light source 15 oscillates a laser light which is a coherent light. The illumination apparatus 10 includes a light scanner 20, a light condensing device 30, a light-path adjustment device 40 and a light diffusion device 50, which process light emitted from the laser light source 15. In the example shown in FIG. 1, the light scanner 20, the light condensing device 30, the light-path adjustment device 40 and the light diffusion device 50 are located in this order along a light path of a laser light from the laser light source 15, and they process a laser light in this order. As described in detail below, the illumination device 10 described herein can illuminate the illumination area Z in various light distribution patterns, by means of optical functions of the light-path adjustment device 40 and the light diffusion device 50, while the illumination device 10 has a simple structure. Herebelow, the respective constituent elements are described in series.

In the example shown in FIG. 1, the laser light source 15 has a plurality of light source units 17 that emit laser lights. The light source units 17 may be independently arranged, or may be a light source module formed by arranging the light source units 17 side by side on a common substrate. For example, the light source units 17 have a first light source unit 17a that oscillates a light having a red emission wavelength range, a second light source unit 17b that oscillates a light having a green emission wavelength range, and a third light source unit 17c that oscillates a light having a blue emission wavelength range. According to this example, by overlapping three laser lights emitted from the light source units 17a, 17b and 17c, illumination lights of various colors including a white illumination light can be generated.

Although an example in which the laser light source 15 has the three light source units 17a, 17b and 17c having emission wavelength ranges different from one another is described herebelow, the present invention is not limited thereto. The laser light source 15 may have two light units 17 having emission wavelength ranges different from each other, or four or more light units 17 having emission wavelength ranges different from one another. In addition, in order to increase emission intensity, a plurality of the light source units 17 may be provided for each emission wavelength range.

As shown in FIG. 1, the illumination device 10 includes an emission control unit 12 connected to the laser light source 15. The control unit 12 discretely controls emission timings of laser lights emitted by the laser light source 15, or illumination timings of the illumination area. In particular, the control unit 12 can switch emission of laser lights and stop of emission of laser lights from the light source unit 17a, 17b or 17c, independently from other light source units. The control of emitting or not emitting laser lights by the control unit 12 is carried out based on scanning timings of a plurality of laser lights by the light scanner 20, in other words, based on incident positions of a laser light on the light-path adjustment device 40 and the light diffusion device 50. As described above, in the case where the laser light source 15 can emit three laser lights, i.e., a red laser light, a blue laser light and a green laser light, it is possible to generate an illumination light of a color that is a combination of given two or more colors of red, blue and green, by controlling an emission timing of each laser light.

The control unit 12 may control an emission timing of a light from the laser light source 15, may control an incident timing of a laser light incident on the light diffusion device 50, or may control an illumination timing at which a laser light diffused by the light diffusion device 50 illuminates an illumination range. Herebelow, an example in which the control unit 12 controls an emission timing of a light from the laser light source 15 is mainly described.

The emission control unit 12 may control whether a laser light is emitted from each light source unit 17 or not, i.e., ON/OFF of emission, or may switch blocking or not blocking of a light path of a laser light having been emitted from each light source unit 17. In the latter case, light shutter units, not shown, may be disposed between the respective light source units 17 and the light scanner 20, such that passage and blockage of laser light can be switched by the light shutter units.

Next, the light scanner 20 is described. The light scanner 20 adjusts a traveling direction of a laser light emitted from the laser light source 15. In the illustrated example, the light scanner 20 can change a traveling direction of a laser light with time. Due to the light path adjustment of the light scanner 20, a laser light emitted from the laser light source 15 scans the light condensing device 30, and further scans the light-path adjustment device 40. In the example shown in FIGS. 1 and 2, the light scanner 20 has a reflection device 21 that is rotatable about a rotational axis line ra. The reflection device 21 includes reflection surfaces 22 at positions surrounding the rotational axis line ra. In the illustrated example, the reflection device 21 is formed as a polygonal mirror having six reflection surfaces 22a to 22f. When the reflection device 21 is rotated about its central axis line as the rotational axis line ra, a reflection direction of a light having entered there from a certain direction can be changed cyclically. In the illustrated example, a laser light going out from the light scanner 20 travels along one of light paths constituting divergent light fluxes whose divergent point is the incident position on the light scanner 20.

The respective six reflection surfaces 22a to 22f of the reflection device 21 are formed as flat surfaces. Thus, a light that entered the reflection device 21 from a certain direction and is reflected there repeatedly travels along a path extending in a direction orthogonal to the rotational axis line ra, on the light condensing device 30 and the light-path adjustment device 40.

Figure 3:
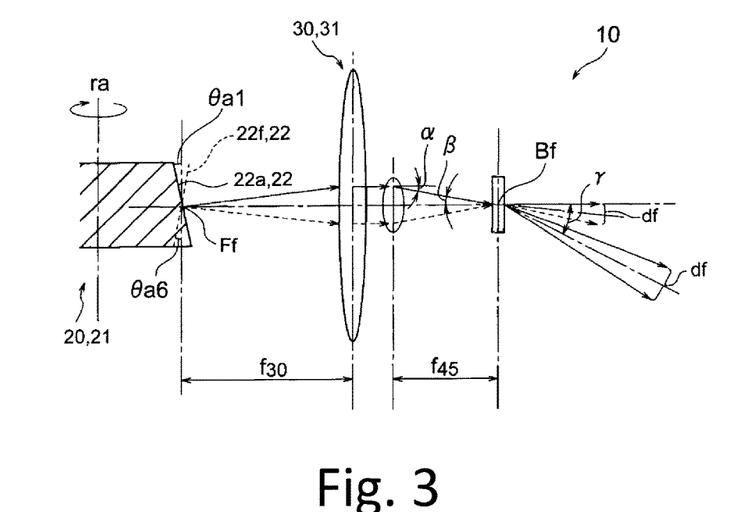
FIG. 3 is a partial side view showing the illumination device of FIG. 1.

Further, in the illustrated example, values of angles defined by the respective reflection surfaces 22a to 22f with respect to the rotational axis line ra are not uniform through the reflection surfaces 22a to 22f. FIG. 3 is a view showing the reflection device 21 in a section passing through the rotational axis line ra. As shown in FIG. 3, an angle $\theta a1$ of the first reflection surface 22a with respect to the rotational axis line ra is inclined reversely to an angle $\theta a6$ of the sixth reflection surface relative to the rotational axis line ra, which is indicated by two-dot chain lines, with the rotational axis line ra as a reference. As a result, incident positions of a light reflected by the reflection device 21 on the light condensing device 30 and the light-path adjustment device 40 vary in a direction parallel to the rotational axis line ra, depending on the fact that by which reflection surface 22a to 22f the light is reflected. Namely, in the illustrated example, a scanning path of the laser light on the light condensing device 30 and a scanning path of the laser light on the light-path adjustment device 40 vary two-dimensionally.

In the illustrated example, the light source units 17a, 17b and 17c are arranged in a direction parallel to the rotational axis line ra of the reflection device 12 (see FIG. 1). The reflection surface of the reflection device 21 has, along its rotational axis line ra, a first reflection part 21a, a second reflection part 21b and a third reflection part 21c. The first reflection part 21a reflects a laser light emitted from the first light source unit 17a, and cyclically changes a traveling direction of the laser light in a plane parallel to the rotational axis line ra. In addition, the second reflection part 21b reflects a laser light emitted from the second light source unit 17b, and the third reflection unit 21c reflects a laser light emitted from the third light source unit 17c.

The light scanner 20 is not limited to the illustrated reflection device 21. It is possible to use, as the light scanner 20, MEMS (micro electromechanical systems) such as a digital micromirror device (DMD), for example. Further, the light scanner 20 may change a light path of a laser light only in one-dimensional direction, so that scanning paths of a laser light on the light condensing device 30 and the light-path adjustment device 40 define one straight line.

Next, the light condensing device 30 is described. A light going out from the light scanner 20 then enters the light condensing device 30. The light condensing device 30 is disposed on a light path of a laser light from the light scanner 20 up to the light-path adjustment device 40. The light condensing device 30 has an optical effect on a laser light whose light path has been changed by the light scanner 20. In the illustrated example 30, the light condensing device 30 is formed by a light condensing lens 31 having a focal point. The light condensing lens 31 is disposed on a light path of a laser light from the light scanner 20 toward the light-path adjustment device 40.

Figure 2:
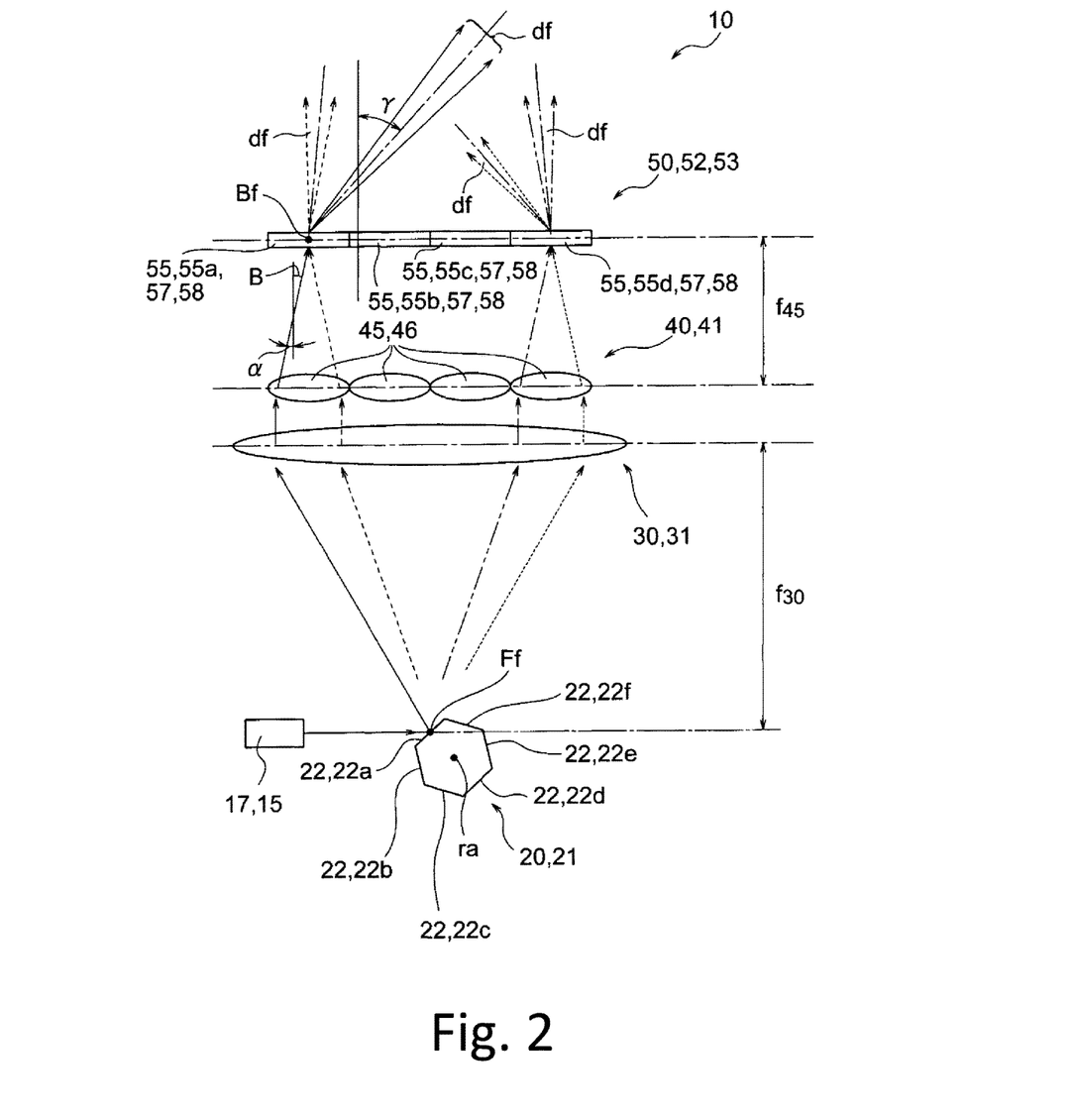
FIG. 2 is a plan view showing the illumination device of FIG. 1.

In the illustrated example, as shown in FIG. 2, the light scanner 20 is located on a position based on a front-side focal point Ff of the light condensing device 30. Herein, "a position based on the front-side focal point Ff" typically means that the light scanner 20 is positioned on the front-side focal point Ff of the light condensing device 30. However, it is not exactly necessary that the light scanner 20 is located on the front-side focal point Ff. The light scanner 20 may be located in the vicinity of the front-side focal point Ff. Also in this case, an effect of the light condensing device 30 described later can be obtained.

Particularly in the illustrated example, the reflection device 21 constituting the light scanner 20 is disposed apart from the light condensing lens 31 by a focal distance of the light condensing lens 31 along an optical axis of the light condensing lens 31. As described above, a laser light going out from the reflection device 21 travels along one of light paths constituting divergent light fluxes whose divergent point is the reflection position in the reflection device 21. Thus, as shown in FIGS. 2 and 3, when a laser light incident on each position of the light condensing lens 31 transmits through the light condensing lens 31, an optical path of the laser light is adjusted so as to travel in a direction parallel to the optical axis of the light condensing lens 31. Namely, the light going out from each position of the light condensing device 30 travels along one of light paths constituting parallel light fluxes that travel in a direction parallel to the optical axis of the light condensing lens 31. Since the light scanner 20 changes a traveling direction of a laser light with time, an incident position on the light condensing device 30 changes with time.

A plurality of the light condensing devices 30 may be provided correspondingly to the respective light source units 17a, 17b and 17c included in the laser light source 15. Alternatively, a single light condensing device 30 capable of adjusting light paths of laser lights from the light source units 17a, 17b and 17c may be provided.

Next, the light-path adjustment device 40 is described. The light going out from the light condensing device 30 then enters the light-path adjustment device 40. The light-path adjustment device 40 is disposed on a light path of a laser light from the light condensing device 30 up to the light diffusion device 50. The light-path adjustment device 40 is opposed to the light condensing device 30. The light-path adjustment device 40 has an optical effect on a laser light whose light path has been changed by the light condensing device 30. An incident position of a laser light on the light-path adjustment device 40 varies depending on an incident position of the laser light on the light condensing device 30, i.e., depending on a light path determined by the light scanner 20.

The light-path adjustment device 40 includes element adjustment devices 45. The element adjustment devices 45 are arranged in a direction orthogonal to the optical axis of the light condensing lens 31. Thus, to which one of the element adjustment devices 45 the laser light goes from the light condensing device 30 is determined depending on an incident position of the laser light on the light condensing device 30. In addition, an incident position of the laser light on one element adjustment device 45 varies depending on an incident position of the laser light on the light condensing device 30. In addition, an emergent angle α of the laser light from each element adjustment device 45 varies depending on an incident position on the element adjustment device 45. As shown in FIGS. 2 and 3, the emergent angle α from the element adjustment device 45 is an angle defined by a traveling direction of a light going out from the element adjustment device 45 with respect to a normal direction of the element adjustment device 45.

Figure 4:
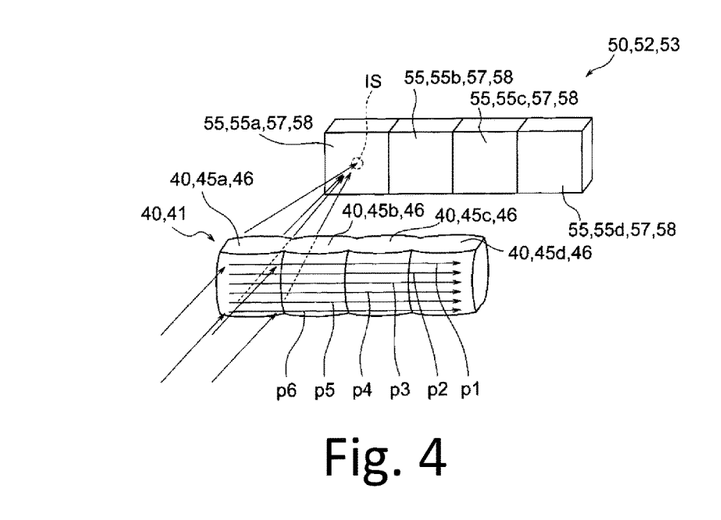
FIG. 4 is a perspective view showing a light-path adjustment device and a light diffusion device.

As shown in FIGS. 1 and 4, the illustrated light-path adjustment device 40 is a lens array 41 including unit lenses 46 constituting the element adjustment devices 45. The lens array 41 is located on a position opposed to the light condensing lens 31 along the optical axis of the light condensing lens 31 constituting the light condensing device 30. The unit lenses 46 included in the lens array 41 are positioned apart from the light condensing lens 31 by a certain distance along the optical axis of the light condensing lens 31. Each unit lens 46 is positioned such that its optical axis is parallel to the optical axis of the light condensing lens 31. As shown in FIG. 1, the element adjustment devices 45 are arranged in a direction orthogonal to the rotational axis line ra of the reflection device 21 constituting the light scanner 20. As a result, the light-path adjustment device 40 extends long in a direction orthogonal to the rotational axis line ra of the reflection device 21.

In the illustrated example, as described above, the laser light going out from the light condensing lens 31 travels in a direction parallel to the optical axis of the light condensing lens 31. Namely, the light incident on each element adjustment device 45 of the light-path adjustment device 40 travels in a direction parallel to the optical axis of each element adjustment device 45. Thus, as shown in FIGS. 2 and 3, the laser light having transmitted through each element adjustment device 45 travels toward a rear-side focal point Bf of the element adjustment device 45. Namely, in the illustrated example, the laser light going out from each element adjustment device 45 travels along one of light paths constituting convergent light fluxes that converge on the rear-side focal point Bf.

As shown in FIG. 1, a plurality of the light-path adjustment devices 40 may be provided correspondingly to the light source units 17a, 17b and 17c included in the laser light source 15. Alternatively, a single light-path adjustment device 40 capable of adjusting light paths of laser light from the lights source units 17a, 17b and 17c may be provided.

Next, the light diffusion device 50 is described. As shown in FIG. 1, the light diffusion device 50 diffuses an incident light, and directs the diffused light toward the illumination area Z. The illumination area Z is illuminated by the diffused light. The light diffusion device 50 includes element diffusion devices 55. Each element diffusion device 55 is provided correspondingly to any one of the element adjustment devices 45. A laser light going out from the corresponding element adjustment enters each element diffusion device 55. The element diffusion device 55 diffuses the incident light, and directs the diffused light df toward a corresponding element illumination area Zp. Namely, the element illumination area Zp corresponding to the element diffusion device 55 is illuminated by the diffused light df going out from each element diffusion device 55.

The element illumination area Zp constitutes a part of the illumination area Z. At least a part of the element illumination area Zp corresponding to one element diffusion device 55 is not overlapped with element illumination areas Zp corresponding to the other element diffusion devices 55. Namely, a combination (an assembly) of the element illumination areas Zp corresponding to the element diffusion devices 55 is the illumination area Z that can be illuminated by the illumination device 10. In other words, each position or each area of the illumination area Z belongs to any of the element illumination areas Zp. Thus, by using only the diffused light df from one or some of the element diffusion device(s) 55, a pattern illumination in the illumination area Z can be achieved. By selecting an element diffusion device(s) 55 to be illuminated by a laser light, a light distribution pattern can be controlled.

Further, an emergent angle γ of a laser light from the element diffusion device 55 varies depending on an incident angle β of the laser light on the element diffusion device 55. An incident angle β of the laser light on each element diffusion device 55 depends on an emergent angle α of the laser light from the element adjustment device 45. As described above, an emergent angle α of the laser light from the element adjustment device 45 varies depending on an incident position of the laser light on the element adjustment device 45. Thus, an emergent angle γ of the laser light from the element diffusion device 55 varies depending on an incident position of the laser light on the element adjustment device 45 corresponding to the element diffusion device 55. Namely, the diffused light df diffused by the element diffusion device 55 illuminates a part that is determined depending on the fact that on which position of the corresponding element adjustment device 45 the laser light constituting the diffused light df is incident. Thus, by irradiating only one or some of the element adjustment device(s) 45 with the laser light, a pattern illumination in the element illumination area Zp can be achieved. By selecting an area of the element adjustment device 45 to be irradiated with the laser light, a light distribution pattern can be controlled.

The illumination area Z and the element illumination area Zp, which constitutes a part of the illumination area Z, are illumination areas of near fields that are overlappingly illuminated by respective element diffusion devices 55 in the light diffusion device 50. An illumination range of a far field is generally expressed as a diffusion angle distribution in an angular space, rather than an actual illumination area size. The terms "illumination area" and "element illumination area" in this specification include a diffusion angle range in an angular space in addition to an actual illumination area (illumination range). Thus, a predetermined range illuminated by the illumination device 10 of FIGS. 1 and 5 can be an area that is greatly larger than the illumination area Z of a near field shown in FIGS. 1 and 4.

An incident angle β on the element diffusion device 55 is an angle defined by a traveling direction of a light that enters the element diffusion device 55 with respect to the normal direction of the light diffusion device 50. On the other hand, an emergent angle γ from the element diffusion device 55 is an angle defined by a traveling direction of a light going out from the element diffusion device 55 with respect to the normal direction of the light diffusion device 50. In this embodiment, a light going out from the element diffusion device 55 becomes a diffused light df. When a diffusion angle cannot be neglected, an emergent angle γ from the element diffusion device 55 is regarded as an angle defined by a direction in which a brightness peak of the diffusion light is generated, with respect to the normal direction of the light diffusion device 50.

As shown in FIGS. 1 and 4, in the illustrated light diffusion device 50, each element diffusion device 55 is disposed oppositely to the corresponding element adjustment device 45. The element diffusion devices 55 are arranged on a virtual plane that is apart from the element adjustment devices 45 by a certain distance. As shown in FIGS. 2 and 3, each element diffusion device 55 is disposed oppositely to the element adjustment device 45 along an optical axis of the unit lens 46 constituting the corresponding element adjustment device 45. Namely, as shown in FIG. 1, similarly to the element adjustment devices 45, the element diffusion devices 55 are arranged in a direction orthogonal to the rotational axis line ra of the reflection device 21 constituting the light scanner 20. As a result, the light diffusion device 50 extends long in a direction orthogonal to the rotational axis line ra of the reflection device 21.

In addition, in the illustrated example, as shown in FIGS. 2 and 3, each element diffusion device 55 is located on a position based on the rear-side focal point Bf of the unit lens 46 constituting the corresponding element adjustment device 45. Herein, "a position based on the rear-side focal point Bf" typically means that the each element diffusion device 55 is positioned on the rear-side focal point Bf. However, it is not exactly necessary that each element diffusion device 55 is located on the rear-side focal point Bf. The element diffusion device 55 may be located in the vicinity of the rear-side focal point Bf. As described above, in the illustrated example, an emergent light from each element adjustment device 45 travels along one of light paths constituting convergent light fluxes that converge on the rear-side focal point Bf. Thus, as shown in FIGS. 4 and 5, each element adjustment device 45 and each element diffusion device 55 allows a laser light to enter the limited irradiation area IS of the corresponding element diffusion device 55, irrespective of an incident position of the laser light on the element adjustment device 45.

In the example shown in FIG. 1, correspondingly to the fact that the laser light source 15 has the first to third light source units 17a, 17b and 17c, the light diffusion device 50 has a first light diffusion device 50a, a second light diffusion device 50b and a third light diffusion device 50c. A laser light from the first light source unit 17a enters the first light diffusion device 50a, a laser light from the second light source unit 17b enters the second light diffusion device 50b, and a laser light from the third light source unit 17c enters the third light diffusion device 50c. By using laser lights that have entered the respective light diffusion devices 50a, 50b and 50c so as to be diffused, the one and the same illumination area Z can be illuminated. Thus, the first light diffusion device 50a directs the red light from the first light source unit 17a toward the illumination area Z, the second light diffusion device 50b directs the green light from the second light source unit 17b toward the illumination area Z, and the third light diffusion device 50c directs the blue light from the third light source unit 17c toward the illumination area Z, whereby the illumination area Z can be illuminated in white.

Figure 5:
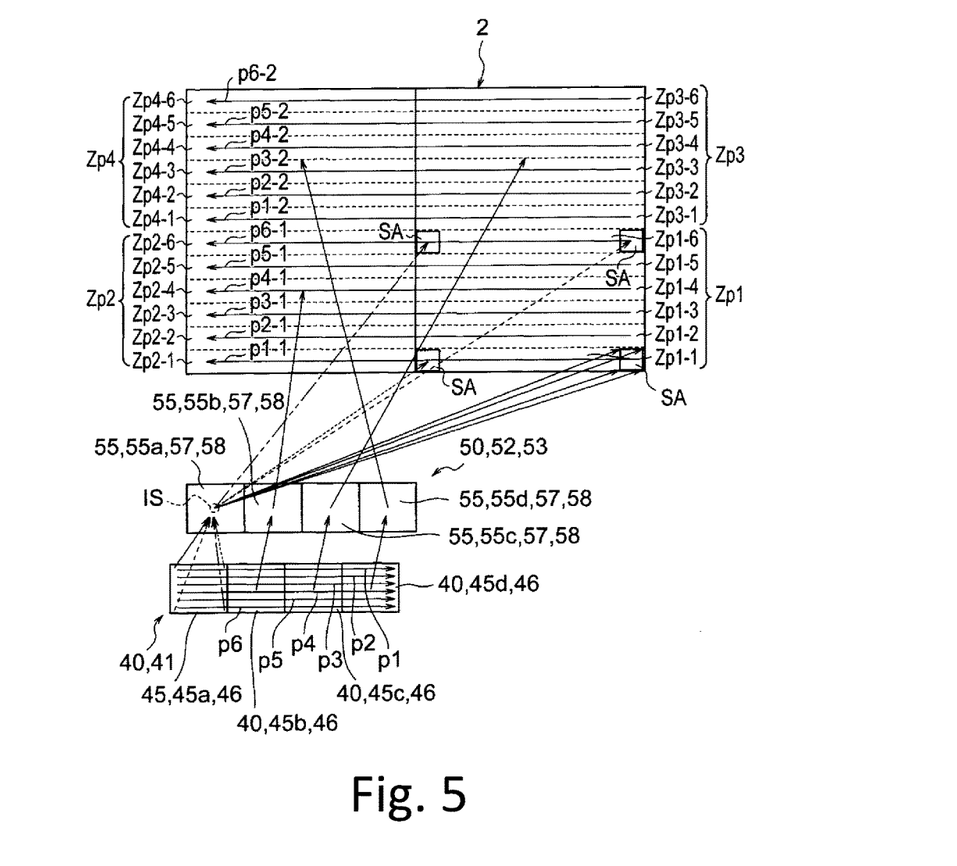
FIG. 5 is a view showing light paths from the light-path adjustment device up to an illumination area in the illumination device of FIG. 1.

FIG. 5 is a schematic view in which the light-path adjustment device 40, the light diffusion device 50, and the element illumination areas Zp are related to each other. In the example shown in FIG. 5, the light-path adjustment device 40 includes four element adjustment devices 45 that are linearly arranged. Thus, the light diffusion device 50 includes four element diffusion devices 55 that are linearly arranged. The illumination area Z is planarly divided into four element illumination areas Zp1 to Zp4 which are arranged in a lattice pattern (grid pattern). Namely, in the illustrated example, one element illumination area Zp is not overlapped with the other element illumination areas Zp. The first element diffusion devices 55a of the respective light diffusion devices 50a, 50b and 50c illuminate the first element illumination area Zp1. Similarly, the second to fourth element diffusion devices 55b, 55c and 55d of the respective light diffusion devices 50b, 50c and 50d illuminate the element illumination areas Zp2, Zp3 and Zp4, respectively.

The light diffusion device 50 is formed with the use of a hologram storage medium 52, for example. In the example shown in FIG. 1, three hologram storage media 52a, 52b and 52c are provided correspondingly to the respective light diffusion devices 50a, 50b and 50c. The respective hologram storage media 52 are provided correspondingly to laser lights of different wavelength ranges. By using laser lights of different wavelength ranges which have entered the whole area of the respective hologram storage media 52 so as to be diffused, the one and the same illumination area Z can be illuminated.

Each hologram storage medium 52 is segmented into element diffusion devices 55. The respective element diffusion devices 55 are formed of element holograms 57 storing interference fringe patters different from one another. A laser light incident on each element hologram 57 is diffracted by an interference fringe pattern, and illuminates a corresponding element illumination area Zp. Note that a diffusion light df that is diffused by the element hologram 57 at a certain instant illuminates only a part in the element illumination area Zp. Since an incident angle β of an incident light on the element hologram 57 changes, an emergent angle γ from the element hologram 57 varies, whereby the whole area in the element illumination area Zp can be illuminated.

Generally, when a wavelength of a laser light (coherent light) incident on the hologram storage medium is represented as "λ", an incident angle of the laser light on the hologram storage medium is represented as "x", an emergent angle (diffraction angle) of the laser light from the hologram storage medium is represented as "y", and a microstructure pitch (diffraction pitch) of the hologram storage medium is represented as "p", a relational expression "sin(x)±sin(y)=λ/p" is established. Thus, in a case where the light diffusion Device 50 has a hologram storage medium, when the microstructure pitch p of the hologram storage medium is constant and the wavelength λ of the laser light is constant, "λ/p" in the above relational expression become a constant. Thus, it can be understood that the emergent angle γ of the laser light varies depending on the incident angle x thereof, from the aforementioned relational expression. In addition, when the element diffusion device 55 formed of the element hologram 57, by variously adjusting the interference fringe patterns stored in the element hologram 57, a traveling direction of a laser light that is diffracted by each element hologram 57, in other words, a traveling direction of a laser light df that is diffused and deflected by each element hologram 57 can be controlled.

The element hologram 57 can be manufactured as a volume type hologram, for example. To be more specific, when a hologram photosensitive material that is a matrix of the element hologram 57 is irradiated with a reference light and an object light of a coherent light interfering with each other, interference fringes by the light interference are formed on the hologram photosensitive material so that the element hologram 57 is manufactured. By emitting a laser light toward the element diffusion device 55 such that the laser light travels reversely to the light path of the reference light that was used when the element hologram 57 was manufactured, a diffraction light goes out from the element hologram 57 reversely along the light path of the object light that was used when the element hologram 57 was manufactured.

Instead of being formed by using a real object light and a reference light, a complicated interference fringe pattern formed on each element hologram 57 can be designed by using a computer based on a wavelength and an incident direction of expected illumination light as well as a shape and a position of an image to be reconstructed. An element hologram 57 thus obtained is also referred to as computer generated hologram (CGH). In addition, a Fourier conversion hologram in which respective points on each element hologram 57 have the same diffusion angle properties may be generated by a computer. Further, a size and a position of an actual illumination range may be set by disposing an optical member such as a lens behind an optical axis of an element illumination area Zp.

One of the advantages of providing the element hologram 57 as the element diffusion device 55 is that a light energy density of laser light can be decreased by diffusion. Another advantage is that the element hologram 57 can be used as a directional surface light source. In this case, as compared with a conventional lamp light source (point light source), a luminance on a light source surface for achieving the same illumination distribution can be decreased. Thus, safety of laser light can be improved. Namely, even when a person looks a laser light having passed through the element illumination area Zp with his/her eyes, the eyes are less affected as compared with a case in which a person looks a single point light source with his/her eyes.

Next, an operation of the illumination device 10 as structured above is described.

As shown in FIG. 1, based on a control signal from the control unit 12, the respective light source units 17a, 17b and 17c oscillate laser lights (laser beams) of respective wavelength ranges. Laser lights emitted from the laser light source 15 firstly travel toward the reflection device 21 constituting the light scanner 20.

The reflection device 21 is continuously rotated about the rotational axis line ra. Thus, the six reflection surfaces 22a to 22f included in the reflection device 21 reach a laser light irradiation position in series. Each of the reflection surfaces 22a to 22f changes its orientation at the incident position. Thus, the laser light reflected by the reflection device 21 travels toward the light condensing device 30 along one of light paths constituting divergent light fluxes whose divergent point is the reflection position of the laser light. In the illustrated example, the reflection point of the reflection device 21 is located on a position based on the front-side focal point Ff of the light condensing lens 31 constituting the light condensing device 30. Thus, the light reflected by the reflection device 21 is deflected by the light condensing lens 31 so as to travel toward the light-path adjustment device 40 along one of light paths constituting parallel light fluxes traveling in a direction parallel to the optical axis of the light condensing lens 31.

Each of the reflection surfaces 22a to 22f of the reflection device 21 changes its orientation such that an angle defined with respect to the incident direction of the laser light continuously decreases or increases at the incident position. Thus, incident positions of the laser light whose light path has been changed by the light scanner 20 on the light condensing device 30 and the light-path adjustment device 40 toward which the laser light then travels move in a direction not parallel to the rotational axis line ra, in particular, in the illustrated example, in a direction orthogonal to the rotational axis line ra in one orientation. In addition, angles defined by the respective reflection surfaces 22a to 22f included in the reflection device 21 with respect to the rotational axis line ra differ from one another. Thus, the laser lights reflected by the different reflection surfaces 22a to 22f enter the light condensing device 30 and the light-path adjustment device 40 toward which the laser lights then travel, at different positions from one another in a direction parallel to the rotational axis line ra.

FIGS. 4 and 5 show the variation of an incident position on the light-path adjustment device 40. A path p1 shows a variation of an incident position of a laser light, which has been reflected by the first reflection surface 22a of the reflection device 21, on the light-path adjustment device 40. Similarly, paths p2 to p6 show variations of incident positions of laser lights, which have been reflected by the second reflection surface 22b to the sixth reflection surface 22f. Since the reflection device is continuously rotated about the rotational axis line ra, laser lights are reflected in series by the first reflection surface 22a to the sixth reflection surfaces 22f. At this time, an incident position of the laser light on the light-path adjustment device 40 moves in series along the path p1, the path p2, the path p3, the path p4, the path p5 and the path p6, and further repeats the change from the path p1 to the path p6. As apparent from FIGS. 4 and 5, the laser light reflected by one reflection surface 22 scans in series the first element adjustment device 45a, the second element adjustment device 45b, the third element adjustment device 45c and the fourth element adjustment device 45d, which are included in the light-path adjustment device 40.

A light path of the light incident on the light-path adjustment device 40 is adjusted by each element adjustment device 45 constituting the light-path adjustment device 40. In the illustrated example, the light is incident on each element adjustment device 45 from a certain direction. Thus, laser lights incident on respective positions of the element adjustment device 45 converge at a position apart therefrom by a focal distance $f_{45}$ of the element adjustment device 45. Namely, the laser lights incident on the respective positions of one element adjustment device 45 go out therefrom at emergent angels different from one another.

Thereafter, the laser light whose light path has been adjusted by the light-path adjustment device 40 enters the light diffusion device 50. In particular, the laser light, whose light path has been adjusted by each element adjustment device 45 of the light-path adjustment device 40, enters the element diffusion device 55 corresponding to the element adjustment device 45. In the illustrated example, each element diffusion devices 55 constituting the light diffusion device 50 is located on a position apart from the corresponding element adjustment device 45 by a focal distance $f_{45}$ of the unit lens 46 constituting the element adjustment device 45, in particular, a position based on the rear-side foal point Bf. Thus, the laser light enters the limited irradiation area IS of each element diffusion device 55.

As described above, emergent angles α of laser lights going out from respective positions of one element adjustment device 45 differ from one another. Each element diffusion device 55 diffuses the laser light, and direct the diffused light df to a direction depending on incident angles β of the laser light. The diffused light df travels toward the element illumination area Zp corresponding to the element diffusion device 55 so as to illuminate the element illumination area Zp.

As has been already described with reference to FIG. 5, the element diffusion devices 55 included in one light diffusion device 50 respectively illuminate the element illumination areas Zp that are at least partially different from one another. In addition, as shown in FIG. 5, a laser light that has entered the element diffusion device 55 at a certain instant illuminates only a spot area SA corresponding to a part of the element diffusion device 55. Namely, laser lights having entered the one element diffusion device 55 at different incident angles β are diffused by the element diffusion device 55 and then illuminate the spot areas SA different from one another in the element illumination area Zp. An incident angle β of the incident light on each element diffusion device 55 varies depending on an incident position at which the light is incident on the element adjustment device 45. In accordance with the variation of the incident angle β on the element diffusion device 55, an emergent angle γ from the element diffusion device 55 varies, whereby the spot area SA is moved through the whole area in the element illumination area Zp. Thus, the whole area in one element illumination area Zp corresponding to one element diffusion device 55 can be illuminated.

FIG. 5 is a schematic view in which the light-path adjustment device 40, the light diffusion device 50, and the element illumination areas Zp are related to each other. In the example shown in FIG. 5, due to the reflection on the first reflection surface 22a of the light scanner 20, the laser light scans the light-path adjustment device 40 along the path p1. At this time, the laser light scans the first element adjustment device 45a included in the light-path adjustment device 40, then scans the second element adjustment device 45b, thereafter scans the third element adjustment device 45c, and finally scans the fourth element adjustment device 45d.

When the laser light scans the first element adjustment device 45a, an incident angle β at which the laser light enters the first element diffusion device 55a continuously changes. In accordance therewith, an emergent angle γ of the diffused light df, which has been diffused by the first element diffusion device 55a, from the first element diffusion device 55a, changes such that the spot area SA scans the first element illumining area Zp1. Similarly, the laser light incident on the second element adjustment device 45b to scan the same along the path 1 is then diffused by the second element diffusion device 55b, and an emergent angle γ of the laser light from the second element diffusion device 55b changes such that the spot area SA scans the second element illumination area Zp2. In addition, the laser light incident on the third element adjustment device 45c to scan the same along the path p1 is then diffused by the third element diffusion device 55c, and an emergent angle γ of the laser light from the third element diffusion device 55c changes such that the spot area SA scans the third element illumination area Zp3. Further, the laser light incident on the fourth element adjustment device 45d to scan the same along the path p1 is then diffused by the fourth element diffusion device 55d, and an emergent angle γ of the laser light from the fourth element diffusion device 55d changes such that the spot area SA scans the fourth element illumination area Zp4.

Namely, in the specific example shown in FIG. 5, when the laser light is incident on the light-path adjustment device 40 to scan the light-path adjustment device 40 along the path p1, the spot area SA of the diffused light df scans the illumination area Z in the order of a path p1-1 and a path p1-2. At this time, the diffused light df illuminates a first area Zp1-1 of the first element illumination area Zp1, a first area Zp2-1 of the second element illumination area Zp2, a first area Zp3-1 of the third element illumination area Zp3 and a first area Zp4-1 of the fourth element illumination area Zp4, in this order.

Similarly, in the specific example shown in FIG. 5, when the laser light is incident on the light-path adjustment device 40 to scan the light-path adjustment device 40 along the path p2, the spot area SA of the diffused light df scans the illumination area Z in the order of a path p2-1 and a path p2-2. At this time, the diffused light df illuminates a second area Zp1-2 of the first element illumination area Zp1, a second area Zp2-2 of the second element illumination area Zp2, a second area Zp3-2 of the third element illumination area Zp3 and a second area Zp4-2 of the fourth element illumination area Zp4, in this order.

Similarly thereafter, when the laser light is incident on the light-path adjustment device 40 to scan the light-path adjustment device 40 along the path p3, the spot area SA of the diffused light df scans the illumination area Z in the order of a path p3-1 and a path p3-2. At this time, the diffused light df illuminates a third area Zp1-3 of the first element illumination area Zp1, a third area Zp2-3 of the second element illumination area Zp2, a third area Zp3-3 of the third element illumination area Zp3 and a third area Zp4-3 of the fourth element illumination area Zp4, in this order.

Next, when the laser light is incident on the light-path adjustment device 40 to scan the light-path adjustment device 40 along the path p4, the spot area SA of the diffused light df scans the illumination area Z in the order of a path p4-1 and a path p4-2. At this time, the diffused light df illuminates a first area Zp1-4 of the fourth element illumination area Zp1, a fourth area Zp2-4 of the second element illumination area Zp2, a fourth area Zp3-4 of the third element illumination area Zp3 and a fourth area Zp4-4 of the fourth element illumination area Zp4, in this order.

Thereafter, when the laser light is incident on the light-path adjustment device 40 to scan the light-path adjustment device 40 along the path p5, the spot area SA of the diffused light df scans the illumination area Z in the order of a path p5-1 and a path p5-2. At this time, the diffused light df illuminates a fifth area Zp1-5 of the first element illumination area Zp1, a fifth area Zp2-5 of the second element illumination area Zp2, a fifth area Zp3-5 of the third element illumination area Zp3 and a fifth area Zp4-5 of the fourth element illumination area Zp4, in this order.

Next, when the laser light is incident on the light-path adjustment device 40 to scan the light-path adjustment device 40 along the path p6, the spot area SA of the diffused light df scans the illumination area Z in the order of a path p6-1 and a path p6-2. At this time, the diffused light df illuminates a sixth area Zp1-6 of the first element illumination area Zp1, a sixth area Zp2-6 of the second element illumination area Zp2, a sixth area Zp3-6 of the third element illumination area Zp3 and a sixth area Zp4-6 of the fourth element illumination area Zp4, in this order.

In the illustrated example, the path p1 in the light-path adjustment device 40 is parallel to and opposite (reverse) to the path p1-1 and the path p1-2 in the illumination area Z. Similarly, the paths p2 to p6 in the light-path adjustment device 40 are parallel to and opposite (reverse) to the corresponding paths in the illumination area Z. In addition, a direction in which the paths p1 to p6 are arranged in the light-path adjustment device 40 is parallel to a direction in which the paths p1-1 to p6-1 are arranged and a direction in which the paths p1-2 to p6-2 are arranged, in each element illumination area Zp. However, a direction in which the paths p1 to p6 in the light-path adjustment device 40 are arranged is parallel to and opposite (reverse) to a direction in which the paths p1-1 to p6-1 in each element illumination area Zp are arranged, and is parallel to and opposite (reverse) to a direction in which the paths p1-2 to p6-2 are arranged. In addition, a direction in which the paths p1 to p6 in the light-path adjustment device 40 are arranged is parallel to and opposite (reverse) to a direction in which the first area Zp1-1 to the sixth area Zp1-6 in the first element illumination area Zp1 are arranged, parallel to and opposite (reverse) to a direction in which the first area Zp2-1 to the sixth area Zp2-6 in the second element illumination area Zp2 are arranged, parallel to and opposite (reverse) to a direction in which the first area Zp3-1 to the sixth area Zp3-6 in the third element illumination area Zp3 and are arranged, and parallel to and opposite (reverse) to a direction in which the first area Zp4-1 to the sixth area Zp4-6 in the fourth element illumination area Zp4 are arranged.

In the aforementioned embodiment, the illumination device 10 includes the light source 15, the light scanner 20 capable of changing a light path of light-source light emitted from the light source, the light diffusion device 50 having element diffusion devices 55 that diffuse the light-source light, and the light-path adjustment device disposed on a light path of the light-source light from the light scanner 20 up to the light diffusion device 50. The light-path adjustment device 40 has the element adjustment devices 45 that are provided correspondingly to the respective element diffusion devices 55, and adjust a light path of the light-source light toward the corresponding element diffusion devices 55. An incident position of the light-source light on the light-path adjustment device 40 varies depending on a light path determined by the light scanner 20. Each element diffusion device 55 illuminates an element illumination area Zp corresponding to the element diffusion device 55.

Namely, according to this embodiment, the light diffusion device 50 includes the element diffusion devices 55, and each element diffusion device 55 can diffuse an incident light in a diffusion pattern or a light distribution pattern different from that of the other element diffusion devices 55. Thus, the element illumination area Zp constituting a part of the illumination area Z can be illuminated by a diffused light going out from one element diffusion device 55. Accordingly, the illumination area Z is segmented into the element illumination areas Zp so that a pattern illumination of each of the element illumination areas Zp can be achieved. By controlling emission of light by the light source 15 depending on the scanning of the light-source light on the light-path adjustment device 40 by means of the light scanner 20, in other words, depending on an incident position of the light-source light on the light-path adjustment device 40, the pattern illumination can be realized easily and stably.

In addition, according to this embodiment, an emergent angle α of the light-source light from each element adjustment device 45 and, in accordance therewith, an incident angle β of the light-source light on each element diffusion device 55 vary depending on an incident position on the element adjustment device 45 corresponding to the element diffusion device 55. In addition, an emergent angle γ from each element diffusion device 55 varies depending on the incident angle β on the element diffusion device 55. Thus, by controlling emission of light by the light source depending on the scanning of the light-source light on one element adjustment device 45 by means of the light scanner 20, in other words, depending on an incident position of the light-source light on one element adjustment device 45, a pattern illumination in only a desired area constituting a part of the element illumination area Zp corresponding to one element diffusion device 55 can be achieved. According to such an embodiment, as compared with a case in which the element illumination area Zp is segmented into areas and additional element diffusion devices are provided on the respective areas, the structure and control of the illumination device can be significantly simplified.

From above, according to this embodiment, since illumination of the element illumination area Zp constituting a part of he illumination area Z is carried out by each element diffusion device 55 included in the light diffusion device 50, rough pattern illumination of the illumination area Z can be realized. Further, since an incident angle β of the light-source light on each element diffusion device 55 can be changed according to an incident position of the light-source light on each element adjustment device 45 included in the light-path adjustment device 40, an emergent direction of the diffused light from each element diffusion device 55 can be changed. Thus, by controlling an incident position of the light-source light on the light-path adjustment device 40, not only a pattern illumination of each of the element illumination areas Zp can be achieved, but also a pattern illumination in each element illumination area Zp can be achieved. Namely, according to the illumination device 10 in this embodiment, a high definition light distribution pattern can be realized by a simple structure using the light diffusion device 50 including the limited number of element diffusion devices 55.

In addition, according to this embodiment, the element illumination areas Zp corresponding to the respective element diffusion devices 55 are not overlapped with one another. Thus, a pattern illumination of the illumination area Z can be precisely performed, while only a predetermined element illumination area Zp can be illuminated.

In this embodiment, the light scanner 20 has the rotatable reflection device 21, the reflection device 21 includes the reflection surfaces 22 at positions surrounding its rotational axis line ra, and an angle defined by one reflection surface 22 included in the reflection surfaces 22 with respect to the rotational axis line ra differs from an angle defined by at least another reflection surface 22 included in the reflection surfaces 22 with respect tot the rotational axis line ra. According to such an embodiment, by the significantly easy operation, i.e., by rotating the reflection device 21 of a simple structure, incident positions of the light-source light on the incident surface of the light-path adjustment device 40 and on the incident surface of the light diffusion device 50 can be changed two-dimensionally. In addition, since the incident positions of the light-source light on the incident surface of the light-path adjustment device 40 and on the incident surface of the light diffusion device 50 can be changed two-dimensionally, an emergent direction of the diffused light from the light diffusion device 50 can be changed two-dimensionally. As a result, it is possible to two-dimensionally change a light distribution pattern in the element illumination area Zp by the illumination device of a simple structure and a simple operation.

In this embodiment, the illumination device 10 further has the light condensing device 30 disposed on a light path of the light-source light form the light scanner 20 up to the light-path adjustment device 40. According to such a illumination device 10, for example, light paths of lights toward the whole area of one element adjustment device 45, further light paths of lights toward the whole area of the light-path adjustment device 40 can be made parallel. In this case, the light-path adjustment device 40 allows an emergent direction of the light-source light incident thereon from a predetermined direction to be changed into a desired direction highly precisely. Thus, a light distribution pattern of a high definition can be controlled highly precisely.

In this embodiment, the light scanner 20 is located on a position based on the front-side focal point Ff of the light condensing device 30. Thus, the light condensing device 30 allows lights, whose light paths are changed by the light scanner 20 to enter respective positions of the light condensing device 30 at different incident angles, to travel in substantially a certain direction. Therefore, the light path adjustment can be more precisely performed by the light-path adjustment device 40, whereby a light distribution pattern of a high definition can be controlled highly precisely.

In this embodiment, the light-path adjustment device 40 is a lens array 41 including the unit lenses 46 constituting the element adjustment devices 45. Namely, the light-path adjustment device 40 has a simple structure, and can be manufactured at low costs. In addition, in combination with the light condensing lens 31, a light path of a light incident on the lens array 41 constituting the light-path adjustment device 40 can be adjusted highly precisely.

In this embodiment, each element diffusion device 55 is located on a position based on the rear-side focal point Bf of the unit lens 46 constituting a corresponding element adjustment device 45. Thus, after a light path of a light, which was incident on each position of the element adjustment device 45, is adjusted by the element adjustment device 45, the light enters the limited irradiation area IS on the element diffusion device 55 in the vicinity of the rear-side focal point Bf. Thus, the diffused light df illuminating the element illumination area Zp goes out from the specific area IS of each element diffusion device 55. Thus, by controlling an emergent direction of the diffused light going out from the element diffusion device 55, a pattern illumination in the element illumination area Zp can be highly precisely achieved in a light distribution pattern of a high definition.

The above-described embodiment can be variously modified. A modification example is described herebelow. In the below description, a component that can be similarly structured as that of the above embodiment has the same reference number as the number used for the corresponding component of the above embodiment, and redundant description is omitted.

In the above-described embodiment, the light diffusion device 50 is formed of the hologram storage media 52, but the present invention is not limited to this example. For example, the light diffusion device 50 may be formed of a lens array group 53 having each light diffusion device 55 as one lens array 58. In this case, the lens array 58 is provided on every element diffusion device 55, and the shape of each lens array 58 is designed such that each lens array 58 illuminates an element illumination area Zp in the illumination area Z.

In addition, in the above-described embodiment, the light-path adjustment device 40 is formed of the lens array 41, and the element adjustment device 45 is formed of the unit lens 46 of the lens array 41, but the present invention is not limited to this example. the light-path adjustment device 40 may further include an auxiliary adjustment device for adjusting an optical axis of a light flux shaped by each unit lens. As the auxiliary adjustment device, a prism array including unit prisms provided correspondingly to the respective unit lenses 46, or a diffraction grating array including diffraction gratings provided correspondingly to the respective unit lenses 46 may be used. In addition, the light-path adjustment device 40 may be a hologram storage medium, and the element adjustment devices 45 may be element holograms having interference fringe patterns different from one another.

Further, in the above-described embodiment, the light condensing device is formed of a convex lens, but the present invention is not limited to this example. For example, the light condensing device 30 may be formed of a concave mirror.

Further, in the above-described embodiment, the laser light source 15 as a light source emits laser lights of a plurality of wavelength ranges, but the present invention is not limited to this example. The light source may be a light source that emits lights of the same wavelength range.

Further, the above-described illumination device 10 may be mounted on a conveyance, or installed at a predetermined location. When it is mounted on a conveyance, the conveyance may be various moving bodies such as a vehicle like an automobile, a flying body like an aircraft, a train, a ship, a diving body and so on.

Although some modification examples of the second embodiment have been described above, the modification examples can be naturally combined and used.

What is claimed is:

1. An illumination device comprising:
a light source;
a light scanner capable of changing a light path of light-source light emitted from the light source;
a light diffusion device having element diffusion devices that diffuse the light-source light; and
a light-path adjustment device disposed on a light path of the light-source light from the light scanner up to the light diffusion device, the light-path adjustment device having element adjustment devices that are provided correspondingly to the respective element diffusion devices, and adjust a light path of the light-source light toward the corresponding element diffusion devices;
wherein:
an incident position of the light-source light on the light-path adjustment device varies depending on a light path determined by the light scanner;
an incident angle of the light-source light on each element diffusion device varies depending on an incident position on the element adjustment device corresponding to the element diffusion device;
an emergent angle from each element diffusion device varies depending on the incident angle;
each element diffusion device illuminates an element illumination area corresponding to the element diffusion device;
the element diffusion devices and the element adjustment devices are arranged along one direction; and
the element illumination areas illuminated by the element diffusion devices are arranged in two directions different from each other.

2. The illumination device according to claim 1, wherein light emitted from each element adjustment device travels along one of light paths of convergent light fluxes to enter an element diffusion device corresponding to the element adjustment device.

3. The illumination device according to claim 1, wherein element illumination areas corresponding to the respective element diffusion devices are not overlapped with one another.

4. The illumination device according to claim 1, wherein:
the light scanner has a rotatable reflection device;
the reflection device includes reflection surfaces at positions surrounding its rotational axis line; and
an angle defined by one reflection surface included in the reflection surfaces with respect to the rotational axis line differs from an angle defined by at least another reflection surface included in the reflection surfaces with respect to the rotational axis line.

5. The illumination device according to claim 1, further comprising a light condensing device disposed on a light path of the light-source light from the light scanner up to the light-path adjustment device.

6. The illumination device according to claim 1, wherein the light-path adjustment device has a lens array including unit lenses constituting the element adjustment devices.

7. The illumination device according to claim 6, wherein each element diffusion device is located on a position based on a rear-side focal point of a unit lens constituting a corresponding element adjustment device.

8. The illumination device according to claim 1, wherein each element adjustment device allows the light-source light to enter a specific area of a corresponding element diffusion device, irrespective of an incident position of the light-source light on the element adjustment device.

9. The illumination device according to claim 1, wherein the light diffusion device has a hologram storage medium, and the element diffusion devices are element holograms including interference fringe patterns different from one another.

10. The illumination device according to claim 1, wherein the light diffusion device has a lens array group having lens arrays constituting the element diffusion devices.

11. The illumination device according to claim 1, further comprising a control unit that controls emission of light from the light source, depending on an incident position of the light-source light on the light adjustment device.

12. The illumination device according to claim 1, wherein the element illumination areas are arranged in a lattice pattern.

13. The illumination device according to claim 1, wherein:

the light scanner has the rotatable reflection device; and due to the rotation of the light scanner, an incident position of the light-source light on the light-path adjustment device changes in a direction parallel to the one direction and a direction orthogonal to the one direction.

14. An illumination device comprising:

a light source;

a light scanner capable of changing a light path of light-source light emitted from the light source;

a light diffusion device having element diffusion devices that diffuse the light-source light; and a light-path adjustment device disposed on a light path of the light-source light from the light scanner up to the light diffusion device, the light-path adjustment device having element adjustment devices that are provided correspondingly to the respective element diffusion devices, and adjust a light path of the light-source light toward the corresponding element diffusion devices;

wherein:

an incident position of the light-source light on the light-path adjustment device varies depending on a light path determined by the light scanner;

an incident angle of the light-source light on each element diffusion device varies depending on an incident position on the element adjustment device corresponding to the element diffusion device;

an emergent angle from each element diffusion device varies depending on the incident angle;

each element diffusion device illuminates an element illumination area corresponding to the element diffusion device;

the element diffusion devices and the element adjustment devices are arranged along one direction; and the element illumination areas illuminated by the element diffusion devices are arranged in a direction which is nonparallel to the one direction.

* * * * *